(12) United States Patent
Jeong et al.

(10) Patent No.: US 12,542,292 B2
(45) Date of Patent: Feb. 3, 2026

(54) SYSTEM AND METHOD FOR CONTROLLING POWER FOR FUEL CELL

(71) Applicants: Hyundai Motor Company, Seoul (KR); Kia Corporation, Seoul (KR)

(72) Inventors: Seong Cheol Jeong, Suwon-si (KR); Hyo Jin Park, Hwaseong-si (KR); Dae Jong Kim, Yongin-si (KR); Sang Chul Yeom, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 810 days.

(21) Appl. No.: 17/890,247

(22) Filed: Aug. 17, 2022

(65) Prior Publication Data

US 2023/0170506 A1    Jun. 1, 2023

(51) Int. Cl.
*H01M 8/04858* (2016.01)
*H01M 8/04537* (2016.01)
*H02J 7/00* (2006.01)

(52) U.S. Cl.
CPC ... *H01M 8/04932* (2013.01); *H01M 8/04582* (2013.01); *H01M 8/04902* (2013.01); *H02J 7/0048* (2020.01); *H02J 7/00712* (2020.01); *H02J 7/007194* (2020.01)

(58) Field of Classification Search
CPC ............... H02J 7/007194; H02J 7/0048; H02J 7/00712; H01M 8/04932; H01M 8/04902; H01M 8/04582; H01M 16/006
See application file for complete search history.

(56) References Cited

U.S. PATENT DOCUMENTS

2016/0351928 A1* 12/2016 Hoshi ............... H01M 8/04582

FOREIGN PATENT DOCUMENTS

KR        10-0921096 B1     10/2009

* cited by examiner

*Primary Examiner* — Christopher P Domone
(74) *Attorney, Agent, or Firm* — Morgan, Lewis & Bockius LLP (57) ABSTRACT

A system and method for controlling power for a fuel cell are disclosed. The system includes: a fuel cell; a load device electrically connected to the fuel cell; a stack controller configured to set a stack limit current on the basis of a current output current of the fuel cell, the stack limit current configured to limit an output current of the fuel cell on the basis of an output voltage of the fuel cell; and a load controller configured to set a consumption limit current on the basis of the set stack limit current, the consumption limit current configured to limit a consumption current of the load device, the load controller being configured to control the consumption current of the load device to a value equal to or lower than the set consumption limit current.

19 Claims, 5 Drawing Sheets

SYSTEM AND METHOD FOR CONTROLLING POWER FOR FUEL CELL

CROSS REFERENCE TO RELATED APPLICATION

The present application claims priority of Korean Patent Application No. 10-2021-0165863 filed on Nov. 26, 2021, the entire contents of which is incorporated herein for all purposes by this reference.

TECHNICAL FIELD

The present disclosure relates to a system and method for controlling power for a fuel cell, which is capable of preventing a drop of output voltage for a fuel cell when a load device requires a high output.

BACKGROUND

A fuel cell refers to a cell, that is, a kind of power generation device that directly converts chemical energy, which is generated by oxidation of fuel, into electrical energy. The fuel cell is basically similar to a chemical cell in that the fuel cell uses oxidation and reduction reactions. However, the fuel cell is different from the chemical cell in that reactants are continuously supplied from the outside and reaction products are continuously removed to the outside of the system, unlike the chemical cell which performs a cell reaction in a closed system. Recently, a fuel cell power generation system has been commercialized, and research has been actively conducted to use the fuel cell as an environmentally-friendly energy source for a vehicle because the reaction product of the fuel cell is pure water.

The fuel cell system includes a fuel cell stack which generates electrical energy through a chemical reaction, an air supply device which supplies air to an air electrode of the fuel cell stack, and a fuel supply device which supplies hydrogen to a hydrogen electrode of the fuel cell stack. That is, air containing oxygen is supplied to the air electrode (cathode) of the fuel cell stack, and hydrogen is supplied to the hydrogen electrode (anode) of the fuel cell stack.

A proton exchange membrane/polymer electrolyte membrane fuel cell (PEMFC) generates electricity through a chemical reaction between oxygen and hydrogen and additionally generates heat and water. A chemical reaction formula of the PEMFC is as follows.

Hydrogen ($H_2$)+Oxygen ($O_2$)⇔Water ($H_2O$)+Electricity+Heat

The durability of the fuel cell stack is degraded by reversible or irreversible degradation as the fuel cell stack is used, and a supply of power to the fuel cell is controlled on the basis of BOL (birth of life) performance. Therefore, when the durability deteriorates as the fuel cell stack is actually used, relatively low voltage is provided even though the same current is required. For this reason, the voltage of the load device connected to the fuel cell stack becomes low, and the load device cannot operate normally.

The foregoing explained as the background is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the related art, and the present disclosure is intended to provide a system and method for controlling power for a fuel cell, which is capable of preventing a drop of output voltage of a fuel cell in consideration of a deterioration in durability of the fuel cell.

According to one aspect, a system for controlling power for a fuel cell may include: a fuel cell; a load device electrically connected to the fuel cell; a stack controller configured to set a stack limit current on the basis of a current output current of the fuel cell, the stack limit current configured to limit an output current of the fuel cell on the basis of an output voltage of the fuel cell; and a load controller configured to set a consumption limit current on the basis of the set stack limit current, the consumption limit current configured to limit a consumption current of the load device, the load controller being configured to control the consumption current of the load device to a value equal to or lower than the set consumption limit current.

The stack controller may set the stack limit current, which is based on the output voltage of the fuel cell, on the basis of the current output current of the fuel cell only when the output voltage of the fuel cell is equal to or lower than a preset reference voltage.

The stack controller may divide a voltage range of the fuel cell, which is equal to or lower than the preset reference voltage, into a plurality of sections and set the stack limit current for each section on the basis of the current output current of the fuel cell at the time of transition between the divided sections.

The stack controller may set a current, which is preset on the basis of the output voltage of the fuel cell, to the stack limit current in a section in which the voltage is lowest among the plurality of divided sections.

The system may further include: a battery electrically connected between the fuel cell and the load device; and a battery controller configured to limit a discharge current of the battery to a value equal to or lower than a discharge limit current.

The load controller may set the consumption limit current by adding the discharge limit current to the set stack limit current.

The battery controller may determine whether the battery can assist power on the basis of a state of charge (SOC) of the battery, the discharge limit current, or a maximum discharge time, and the load controller may control the consumption current of the load device to a value equal to or lower than the set consumption limit current only when the battery cannot assist power.

The discharge limit current may be determined on the basis of a temperature or a state of charge of the battery.

The system may further include: auxiliary machinery electrically connected between the fuel cell and the load device; and a balance of plant (BOP) controller configured to predict a predicted consumption current predicted to be consumed by the auxiliary machinery, and the load controller may set the consumption limit current by subtracting the predicted consumption current from the set stack limit current.

The auxiliary machinery may include a motor device, and the BOP controller may predict the predicted consumption current on the basis of a difference between a current revolution per minute (RPM) and a command RPM of the motor device.

According to another aspect, there is provided a method of controlling power for a fuel cell, the method including: setting a stack limit current on the basis of a current output current of the fuel cell, the stack limit current configured to limit an output current of the fuel cell on the basis of an output voltage of the fuel cell; setting a consumption limit current on the basis of the set stack limit current, the consumption limit current configured to limit a consumption current of a load device; and controlling the consumption current of the load device to a value equal to or lower than the set consumption limit current.

The method may further include: comparing the output voltage of the fuel cell with a preset reference voltage before the setting of the stack limit current, in which in the setting of the stack limit current, the stack limit current, which is based on the output voltage of the fuel cell, is set on the basis of the current output current of the fuel cell only when the output voltage of the fuel cell is equal to or lower than a preset reference voltage.

In the setting of the stack limit current, a voltage range, which is equal to or lower than the preset reference voltage of the fuel cell, may be divided into a plurality of sections, and the stack limit current may be set for each section on the basis of the current output current of the fuel cell at the time of transition between the divided sections.

In the setting of the stack limit current, a current, which is preset on the basis of the output voltage of the fuel cell, may be set to the stack limit current in a section in which a voltage is lowest among the plurality of divided sections.

The method may further include: determining a discharge limit current used to limit a discharge current of a battery electrically connected between the fuel cell and the load device before the setting of the consumption limit current, in which in the setting of the consumption limit current, the consumption limit current may be set by adding the determined discharge limit current to the set stack limit current.

In the determining of the discharge limit current, the discharge limit current may be determined on the basis of a temperature or a state of charge of the battery.

The method may further include: determining whether the battery can assist power on the basis of a state of charge (SOC) of the battery, a discharge limit current, or a maximum discharge time before the controlling of the consumption current of the load device, in which in the controlling of the consumption current of the load device, the consumption current of the load device is controlled to a value equal to or lower than the set consumption limit current only when the battery cannot assist power.

The method may further include predicting a predicted consumption current predicted to be consumed by auxiliary machinery electrically connected between the fuel cell and the load device, in which in the setting of the consumption limit current, the consumption limit current is set by subtracting the predicted consumption current from the set stack limit current.

The auxiliary machinery may include a motor device, and in the predicting of the predicted consumption current, the predicted consumption current may be predicted on the basis of a difference between current RPM and command RPM of the motor device.

According to the system and method for controlling power for a fuel cell according to the present disclosure to achieve the above-mentioned object of the present disclosure, it is possible to determine a situation in which only the fuel cell needs to meet power requirement of the drive motor, and anticipatively apply the predicted consumption current of the auxiliary machinery to this end.

Therefore, it is possible to maintain the output voltage of the fuel cell at the appropriate level in consideration of the deterioration in durability of the fuel cell and prevent rattling of the drive motor, thereby improving driving quality and ride quality of the fuel cell vehicle and improving marketability of the fuel cell vehicle.

DETAILED DESCRIPTION OF THE DISCLOSURE

Specific structural or functional descriptions of exemplary embodiments of the present disclosure disclosed in this specification or application are exemplified only for the purpose of explaining the exemplary embodiments according to the present disclosure, the exemplary embodiments according to the present disclosure may be carried out in various forms, and it should not be interpreted that the present disclosure is limited to the exemplary embodiments described in this specification or application.

Because the exemplary embodiments according to the present disclosure may be variously changed and may have various forms, specific exemplary embodiments will be illustrated in the drawings and described in detail in the present specification or application. However, the descriptions of the specific exemplary embodiments are not intended to limit exemplary embodiments according to the concept of the present disclosure to the specific exemplary embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

Hereinafter, the present disclosure will be described in detail through description of preferred embodiments of the present disclosure with reference to the accompanying drawings. Like reference numerals indicated in the respective drawings refer to like members.

Figure 1:
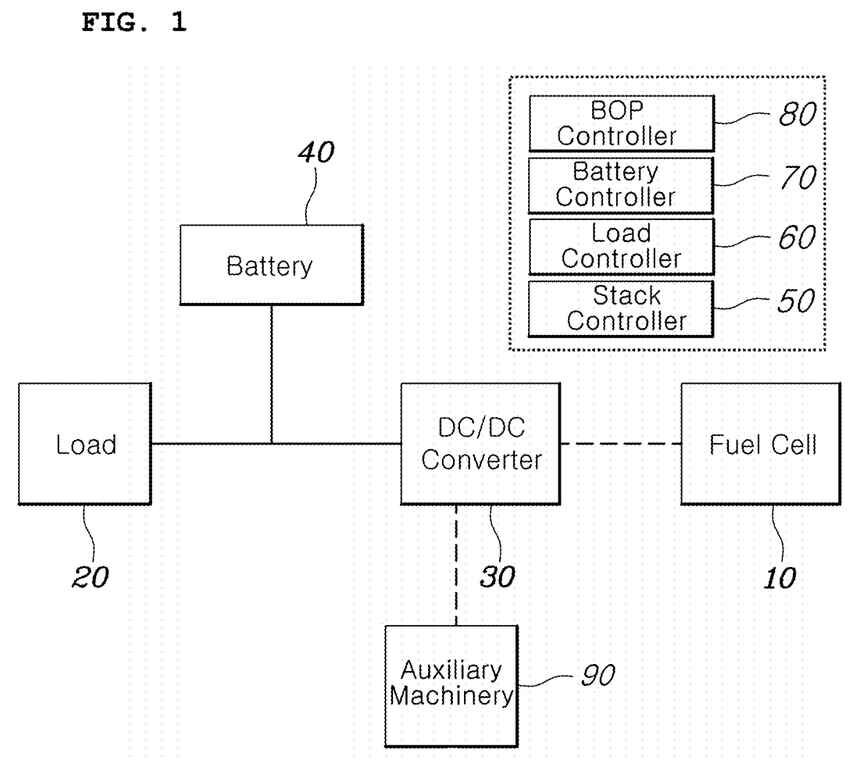
FIG. 1 is a configuration view illustrating a system for controlling power for a fuel cell according to an embodiment of the present disclosure.

FIG. 1 is a configuration view illustrating a system for controlling power for a fuel cell 10 according to an embodiment of the present disclosure.

Referring to FIG. 1, the system for controlling power for the fuel cell 10 according to the embodiment of the present disclosure includes: a fuel cell 10; a load device 20 electrically connected to the fuel cell 10; a stack controller 50 configured to set a stack limit current on the basis of a current output current of the fuel cell 10, the stack limit current being used to limit an output current of the fuel cell 10 on the basis of an output voltage of the fuel cell 10; and a load controller 60 configured to set a consumption limit current on the basis of the set stack limit current, the consumption limit current being used to limit a consumption current of the load device 20, the load controller 60 being configured to control the consumption current of the load device 20 to a value equal to or lower than the set consumption limit current.

The fuel cell 10 may be a fuel cell stack 10 (stack) made by stacking a plurality of cells. Each of the cells included in the fuel cell stack 10 may generate power by being supplied with hydrogen through a hydrogen electrode (anode) and supplied with air containing oxygen through an oxygen electrode (cathode).

The fuel cell stack 10 may include a membrane electrode assembly (MEA) therein.

The stack controller 50 may control power generation of the fuel cell 10 or control an output voltage and an output current of the fuel cell 10. As an embodiment, the stack controller 50 may control flow rates of hydrogen and air to be introduced into the fuel cell 10 or control a voltage and a current outputted from the fuel cell 10, thereby controlling output power of the fuel cell 10.

In particular, the stack controller 50 may monitor the output voltage or the output current of the fuel cell 10. As an embodiment, the stack controller 50 directly may sense the output voltage or the output current of the fuel cell 10 through an output terminal of the fuel cell 10 or receive voltage information sensed by the load controller 60 or the like.

The load device 20 is a power consumption device electrically connected to the fuel cell 10 and may be supplied with power generated by the fuel cell 10. In particular, the load device 20 is supplied with a majority of the necessary power from the fuel cell 10. A battery 40 serves as an energy buffer. The battery 40 may supplement insufficient power or store surplus power.

As an embodiment, the load device 20 may be a drive motor for a vehicle. Alternatively, the load device 20 may be an air blower or air compressor configured to supply air to the fuel cell stack 10, a cooling pump configured to supply a coolant for cooling the fuel cell stack 10, or a power consumption device such as a call of duty (COD) resistor or the like.

The stack controller 50, the load controller 60, a battery controller 70, and a balance of plant (BOP) controller 80 according to the exemplary embodiment of the present disclosure may be implemented by a non-volatile memory (not illustrated) configured to store algorithm for controlling operations of various constituent elements in a vehicle or store data related to software commands for executing the algorithm, and by a processor (not illustrated) configured to perform the respective operations by using the data stored in the corresponding memory (or by executing the algorithm stored in the corresponding memory). In this case, the memory and the processor may be implemented as separate chips. Alternatively, the memory and the processor may be implemented as a single chip in which the memory and the processor are integrated. The processor may be configured in the form of one or more processors.

The stack controller 50 may limit the output current of the fuel cell 10 on the basis of the output voltage of the fuel cell 10. As an embodiment, the stack controller 50 may limit the output current of the fuel cell 10 when the output voltage of the fuel cell 10 drops as the output current of the fuel cell 10 increases. Therefore, the stack controller 50 may prevent the output voltage of the fuel cell 10 from dropping to a predetermined level or lower.

In particular, the stack controller 50 according to the present disclosure may set the stack limit current on the basis of the output voltage of the fuel cell 10, and the stack limit current is used to limit the output current of the fuel cell 10. The stack controller 50 may set the stack limit current on the basis of the current output current of the fuel cell 10. Therefore, it is possible to prevent consumption power of the load device 20 from being excessively limited because of a rapid decrease in current output current of the fuel cell 10.

In addition, the load controller 60 may control the consumption current of the load device 20 to a value equal to or lower than the consumption limit current. In particular, the consumption limit current may be used to limit the consumption current of the load device 20 on the basis of the stack limit current.

As described below, the load controller 60 may set the consumption limit current in consideration of at least any one of the stack limit current of the fuel cell 10, a discharge limit current of the battery 40, and a predicted consumption current of auxiliary machinery-90.

Figure 2:
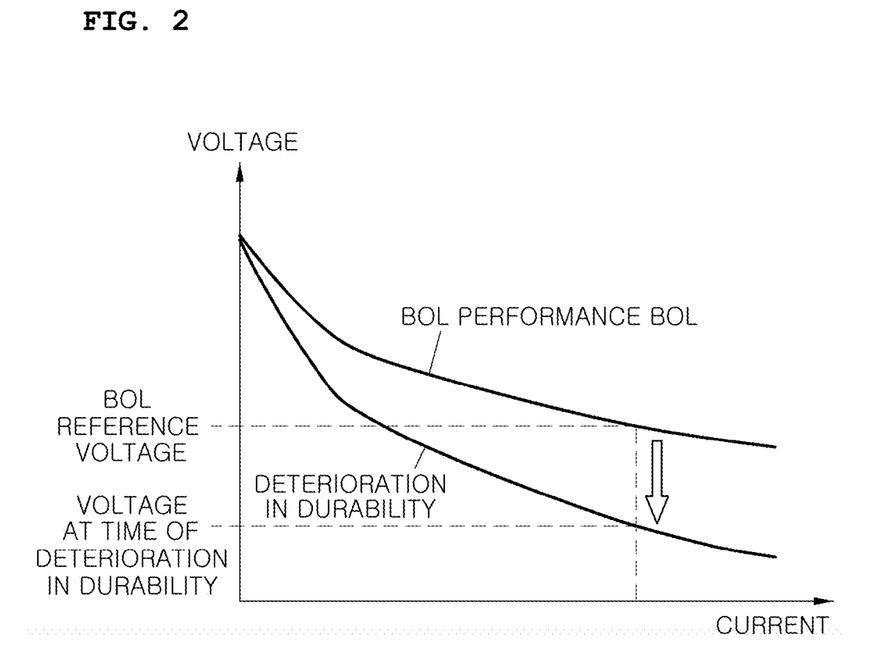
FIG. 2 is a graph illustrating a change in voltage-current curve with respect to a deterioration in durability of the fuel cell according to the embodiment of the present disclosure.

FIG. 2 is a graph illustrating a change in voltage-current curve with respect to a deterioration in durability of the fuel cell 10 according to the embodiment of the present disclosure.

Referring further to FIG. 2, in the voltage-current curve of the fuel cell 10, the output voltage decreases as the output current increases. In particular, the output voltage more quickly decreases as the output current of the fuel cell 10 increases when the durability deteriorates because of the degradation of the fuel cell 10 in comparison with an initial state (birth of life (BOL)) of the fuel cell 10.

Therefore, in a case in which the stack limit current of the fuel cell 10 is set on the basis of the initial state of the fuel cell 10, there is a problem in that the output voltage of the fuel cell 10 quickly decreases when the durability of the fuel cell 10 deteriorates.

Figure 3:
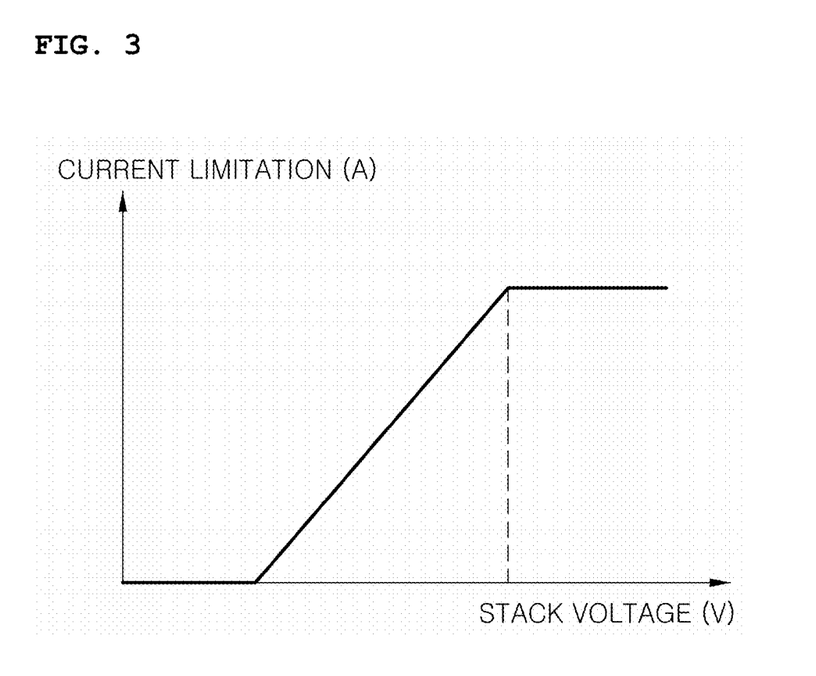
FIG. 3 is a graph illustrating a current limitation corresponding to a voltage of a fuel cell in the related art.
Figure 4:
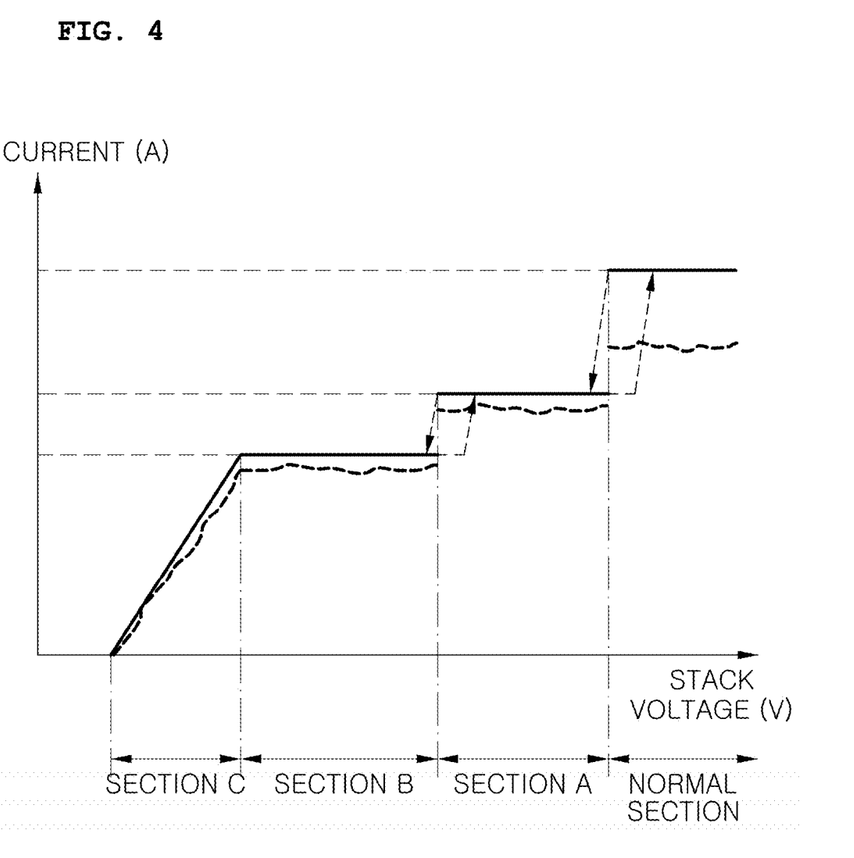
FIG. 4 is a graph illustrating a current limitation corresponding to a voltage of the fuel cell according to the embodiment of the present disclosure.

FIG. 3 is a graph illustrating a current limitation corresponding to a voltage of the fuel cell 10 in the related art, and FIG. 4 is a graph illustrating a current limitation corresponding to a voltage of the fuel cell 10 according to the embodiment of the present disclosure.

Referring further to FIGS. 3 and 4, the graph illustrated in FIG. 3 shows that the stack limit current of the fuel cell 10 in the related art is set on the basis of the output voltage of the fuel cell 10, and particularly, the stack limit current decreases as the output voltage of the fuel cell stack 10 decreases.

That is, the stack limit current of the fuel cell 10 in the related art is set in proportion to the output voltage of the fuel cell 10, and the current output current of the fuel cell 10 is not considered. Therefore, there is a problem in that the drive motor rattles as the output current of the fuel cell 10 is rapidly limited and decreased.

However, as illustrated in FIG. 4, in the case of the current limitation corresponding to a voltage of the fuel cell 10 according to the embodiment of the present disclosure, the stack limit current may be set on the basis of the output voltage of the fuel cell 10, and the stack limit current may be set on the basis of the current output current of the fuel cell 10.

As an embodiment, the stack limit current may be set to be limited in a stepwise manner by applying a preset decrease ratio (e.g., 0.9) to the current output current. In addition, a predetermined decrease slew-rate (A/s) is applied when the stack limit current transitions, such that the stack limit current may linearly transition.

In particular, the stack controller 50 may set the stack limit current, which is based on the output voltage of the fuel cell 10, on the basis of the current output current of the fuel cell 10 only when the output voltage of the fuel cell 10 is equal to or lower than a preset reference voltage.

The preset reference voltage may be preset to be higher than an operating voltage of the load device 20. In particular, the preset reference voltage may be preset to a voltage value made by adding a predetermined offset value (e.g., 30 [V]) to the operating voltage of the load device 20.

More specifically, the stack controller 50 may divide a voltage range, which is equal to or lower than the preset reference voltage, into a plurality of sections and set the stack limit currents for the respective sections on the basis of the current output current of the fuel cell 10 at the time of the transition between the divided sections.

As illustrated in FIG. 4, in a normal section in which the voltage is equal to or higher than the preset reference voltage, the stack controller 50 may control the output current of the fuel cell 10 to a value equal to or lower than a preset stack limit current for the output voltage of the fuel cell 10. In addition, the stack controller may divide the voltage range, which is equal to or lower than the preset reference voltage, into sections A, B, and C, and set the stack limit currents for the respective sections on the basis of the current output current of the fuel cell 10 at the time of the transition between the divided sections.

For example, when the output voltage of the fuel cell stack 10 decreases and enters section A from the normal section, the stack controller 50 may set the stack limit current in section A on the basis of the current output current of the fuel cell stack 10 at the preset reference voltage that transitions between the normal section and section A.

As an embodiment, the stack controller may set the stack limit current in section A by applying the preset decrease ratio (e.g., 0.9) to the current output current of the fuel cell stack 10 at the preset reference voltage that transitions between the normal section and section A.

In addition, in the case of the transition between section A and section B, the stack limit current in section B may be set on the basis of the current output current of the fuel cell 10 at the time of the transition between section A and section B.

On the contrary, the stack limit current also increases when the output voltage of the fuel cell stack 10 increases again, the stack limit current, which is preset when the output voltage of the fuel cell stack 10 decreases, may be used, as it is, as the stack limit current for each section when the output voltage increases.

In particular, in this case, preset hysteresis may be applied to the output voltage. Therefore, it is possible to prevent a frequent change in stack limit current between the plurality of sections.

In the section in which the voltage is lowest among the plurality of divided sections, the stack controller 50 may set the current, which is preset on the basis of the output voltage of the fuel cell 10, as the stack limit current.

For example, in section C in which the voltage is lowest among the plurality of divided sections, the current, which is preset on the basis of the output voltage, may be set as the stack limit current without applying the current output current of the fuel cell stack 10.

In particular, section C, in which the voltage is lowest among the plurality of divided sections, may approach a lower limit value of the operating voltage of the load device 20. Therefore, the stack controller 50 may quickly restore the output voltage of the fuel cell 10 by setting the preset current as the stack limit current so that the output voltage of the fuel cell 10 does not enter a region in which the load device 20 cannot operate.

The system may further include the battery 40 electrically connected between the fuel cell 10 and the load device 20; and the battery controller 70 configured to limit the discharge current of the battery 40 to the discharge limit current or lower.

The battery 40 may be connected in parallel between the fuel cell 10 and the load device 20. Therefore, the battery 40 may supplement power, which is outputted from the fuel cell 10 and supplied to the load device 20, or store surplus power.

The battery 40 includes a plurality of cells and may be charged with power or discharged. In addition, an input voltage or an output voltage of the battery 40 electrically connected to a high side may be relatively higher than the output voltage of the fuel cell 10.

A converter (more specifically, DC/DC converter) may be connected in series with the battery 40 and disposed to be connected in parallel with a main bus terminal between the fuel cell 10 and the load device 20 or disposed to be connected in series between the fuel cell 10 and the load device 20.

The load controller 60 may set the consumption limit current by adding the discharge limit current to the set stack limit current.

The battery 40 may assist the stack output current outputted from the fuel cell 10 while being discharged. That is, the current, which is consumed by the load may be a sum of the stack output current and the discharge current of the battery 40.

Therefore, the load controller 60 may set the consumption limit current, which is used to limit the consumption current of the load device 20, to the consumption limit current (=stack limit current+discharge limit current).

The battery controller 70 determines whether the battery 40 may assist power on the basis of the SOC (state of charge) of the battery 40, a discharge limit current, or a maximum discharge time. The load controller 60 may control the consumption current of the load device 20 to a value equal to or lower than the set consumption limit current only when the battery 40 cannot assist power.

In this case, the case in which the battery 40 cannot assist power may be (1) a case in which the SOC (state of charge) of the battery 40 is equal to or lower than a preset SOC, (2) a case in which the discharge limit current is equal to or lower than a preset current, or (3) a case in which the maximum discharge time is equal to or shorter than a preset time.

The preset SOC may be preset in consideration of the strategy of application of the battery 40 used to control power distribution between the fuel cell 10 and the battery 40. The preset current may be determined on the basis of the state (a temperature, the SOC, or the like) of the battery 40 and preset to a degree at which the current does not sufficiently affect the operation. The preset time may be preset on the basis of whether power, which is equal to or higher than predetermined power, may be continuously outputted depending on hardware specifications of the battery 40.

The system may further include the auxiliary machinery 90 electrically connected between the fuel cell 10 and the load device 20, and the BOP controller 80 configured to predict a predicted consumption current which is predicted to be consumed by the auxiliary machinery 90. The load controller 60 may set the consumption limit current by subtracting the predicted consumption current from the set stack limit current.

The BOP controller 80 may predict the predicted consumption current, which is predicted to be consumed by the auxiliary machinery 90, in addition to the load device 20. For example, the auxiliary machinery 90 may include devices such as a blower or compressor, a coolant pump, a COD resistor, and the like.

In particular, the auxiliary machinery-90 includes a motor device. The BOP controller 80 may predict the predicted consumption current on the basis of a difference between the current revolution per minute (RPM) and command RPM (e.g., an RPM included in a command to cause the motor device to operate under the RPM included in the command) of the motor device. As an embodiment, the BOP controller 80 may predict that the predicted consumption current increases linearly as the difference between the current RPM and the command RPM of the motor device increases.

That is, the predicted consumption current may be predicted as a current that is required to be consumed in addition to the power which is consumed by the auxiliary machinery 90 in the current state.

Therefore, the load controller 60 may set the consumption limit current, which is used to limit the consumption current of the load device 20, to the consumption limit current (=stack limit current−predicted consumption current).

In summary, the load controller 60 may set the consumption limit current, which is used to limit the consumption current of the load device 20, to the consumption limit current (=stack limit current+discharge limit current−predicted consumption current).

Figure 5:
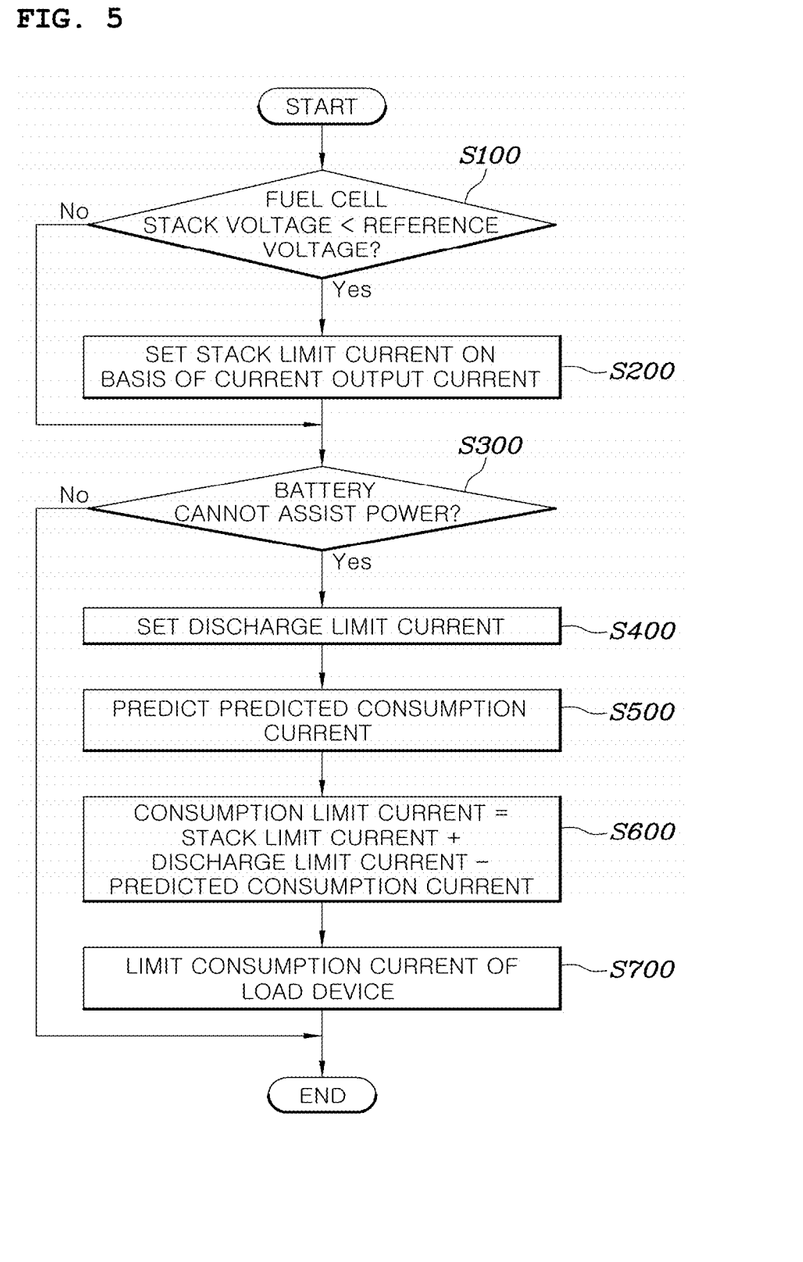
FIG. 5 is a flowchart illustrating a method of controlling power for a fuel cell according to the embodiment of the present disclosure.

FIG. 5 is a flowchart illustrating a method of controlling power for the fuel cell 10 according to the embodiment of the present disclosure.

Referring further to FIG. 5, the method of controlling power for the fuel cell 10 according to the embodiment of the present disclosure includes: step S200 of setting the stack limit current on the basis of the current output current of the fuel cell 10, the stack limit current being used to limit the output current of the fuel cell 10 on the basis of the output voltage of the fuel cell 10; step S600 of setting the consumption limit current on the basis of the set stack limit current, the consumption limit current being used to limit the consumption current of the load device 20; and step S700 of controlling the consumption current of the load device 20 to a value equal to or lower than the set consumption limit current.

The method may further include step S100 of comparing the output voltage of the fuel cell 10 with the preset reference voltage before step S200 of setting the stack limit current. In step S200 of setting the stack limit current, the stack limit current, which is based on the output voltage of the fuel cell 10, may be set on the basis of the current output current of the fuel cell 10 only when the output voltage of the fuel cell 10 is equal to or lower than the preset reference voltage.

In step S200 of setting the stack limit current, the voltage range equal to or lower than the preset reference voltage may be divided into the plurality of sections, and the stack limit currents for the respective sections may be set on the basis of the current output current of the fuel cell 10 at the time of the transition between the divided sections.

In step S200 of setting the stack limit current, the current, which is preset on the basis of the output voltage of the fuel cell 10, may be set as the stack limit current in the section in which the voltage is lowest among the plurality of divided sections.

The method may further include step S400 of determining the discharge limit current used to limit the discharge current of the battery 40 electrically connected between the fuel cell 10 and the load device 20 before step S600 of setting the consumption limit current. In step S600 of setting the consumption limit current, the consumption limit current may be set by adding the determined discharge limit current to the set stack limit current.

In step S400 of determining the discharge limit current, the discharge limit current may be determined on the basis of a temperature or a state of charge of the battery 40.

Before step S700 of controlling the consumption current of the load device 20, whether the battery 40 may assist power is determined on the basis of the SOC (state of charge) of the battery 40, the discharge limit current, or the maximum discharge time. In step S700 of controlling the consumption current of the load device 20, the consumption current of the load device 20 may be controlled to a value equal to or lower than the set consumption limit current only when the battery 40 cannot assist power.

The method may further include step S500 of predicting the predicted consumption current predicted to be consumed by the auxiliary machinery 90 electrically connected between the fuel cell 10 and the load device 20. In step S600 of setting the consumption limit current, the consumption limit current may be set by subtracting the predicted consumption current from the set stack limit current.

The auxiliary machinery 90 includes the motor device. In step S500 of predicting the predicted consumption current, the predicted consumption current may be predicted on the basis of the difference between the current RPM and the command RPM of the motor device.

The method may be performed by one or more of the above-described controllers in conjunction with some elements shown in FIG. 1.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A system for controlling power for a fuel cell, the system comprising:
a fuel cell;
a load device electrically connected to the fuel cell;
a stack controller configured to set a stack limit current on the basis of a current output current of the fuel cell, the stack limit current configured to limit an output current of the fuel cell on the basis of an output voltage of the fuel cell; and
a load controller configured to set a consumption limit current on the basis of the set stack limit current, the consumption limit current configured to limit a consumption current of the load device, the load controller being configured to control the consumption current of the load device to a value equal to or lower than the set consumption limit current.

2. The system of claim 1, wherein the stack controller sets the stack limit current, which is based on the output voltage of the fuel cell, on the basis of the current output current of the fuel cell only when the output voltage of the fuel cell is equal to or lower than a preset reference voltage.

3. The system of claim 2, wherein the stack controller divides a voltage range of the fuel cell, which is equal to or lower than the preset reference voltage, into a plurality of sections and sets the stack limit current for each section on the basis of the current output current of the fuel cell at the time of transition between the divided sections.

4. The system of claim 3, wherein the stack controller sets a current, which is preset on the basis of the output voltage of the fuel cell, to the stack limit current in a section in which the voltage is lowest among the plurality of divided sections.

5. The system of claim 1, further comprising:
a battery electrically connected between the fuel cell and the load device; and
a battery controller configured to limit a discharge current of the battery to a value equal to or lower than a discharge limit current.

6. The system of claim 5, wherein the load controller sets the consumption limit current by adding the discharge limit current to the set stack limit current.

7. The system of claim 5, wherein the battery controller determines whether the battery can assist power on the basis of a state of charge (SOC) of the battery, the discharge limit current, or a maximum discharge time, and the load controller controls the consumption current of the load device to a value equal to or lower than the set consumption limit current only when the battery cannot assist power.

8. The system of claim 5, wherein the discharge limit current is determined on the basis of a temperature or a state of charge of the battery.

9. The system of claim 1, further comprising:
auxiliary machinery electrically connected between the fuel cell and the load device; and
a balance of plant (BOP) controller configured to predict a predicted consumption current predicted to be consumed by the auxiliary machinery,
wherein the load controller sets the consumption limit current by subtracting the predicted consumption current from the set stack limit current.

10. The system of claim 9, wherein the auxiliary machinery comprises a motor device, and the BOP controller predicts the predicted consumption current on the basis of a difference between a current revolution per minute (RPM) and a command RPM of the motor device.

11. A method of controlling power for a fuel cell, the method comprising:
setting, by a stack controller, a stack limit current on the basis of a current output current of the fuel cell, the stack limit current configured to limit an output current of the fuel cell on the basis of an output voltage of the fuel cell;
setting, by a load controller, a consumption limit current on the basis of the set stack limit current, the consumption limit current configured to limit a consumption current of a load device electrically connected to the fuel cell; and
controlling, by the load controller, the consumption current of the load device to a value equal to or lower than the set consumption limit current.

12. The method of claim 11, further comprising:
comparing the output voltage of the fuel cell with a preset reference voltage before the setting of the stack limit current,
wherein in the setting of the stack limit current, the stack limit current, which is based on the output voltage of the fuel cell, is set on the basis of the current output current of the fuel cell only when the output voltage of the fuel cell is equal to or lower than a preset reference voltage.

13. The method of claim 12, wherein in the setting of the stack limit current, a voltage range of the fuel cell, which is equal to or lower than the preset reference voltage, is divided into a plurality of sections, and the stack limit current is set for each section on the basis of the current output current of the fuel cell at the time of transition between the divided sections.

14. The method of claim 13, wherein in the setting of the stack limit current, a current, which is preset on the basis of the output voltage of the fuel cell, is set to the stack limit current in a section in which a voltage is lowest among the plurality of divided sections.

15. The method of claim 11, further comprising:
determining a discharge limit current used to limit a discharge current of a battery electrically connected between the fuel cell and the load device before the setting of the consumption limit current,
wherein in the setting of the consumption limit current, the consumption limit current is set by adding the determined discharge limit current to the set stack limit current.

16. The method of claim 15, wherein in the determining of the discharge limit current, the discharge limit current is determined on the basis of a temperature or a state of charge of the battery.

17. The method of claim 15, further comprising:
determining whether the battery can assist power on the basis of a state of charge (SOC) of the battery, a discharge limit current, or a maximum discharge time before the controlling of the consumption current of the load device, wherein in the controlling of the consumption current of the load device, the consumption current of the load device is controlled to a value equal to or lower than the set consumption limit current only when the battery cannot assist power.

18. The method of claim 11, further comprising:

predicting a predicted consumption current predicted to be consumed by auxiliary machinery electrically connected between the fuel cell and the load device, wherein in the setting of the consumption limit current, the consumption limit current is set by subtracting the predicted consumption current from the set stack limit current.

19. The method of claim 18, wherein the auxiliary machinery comprises a motor device, and in the predicting of the predicted consumption current, the predicted consumption current is predicted on the basis of a difference between current RPM and command RPM of the motor device.

* * * * *